May 20, 1947.  W. G. WILSON  2,420,849
VALVE
Filed Sept. 25, 1943  2 Sheets-Sheet 1
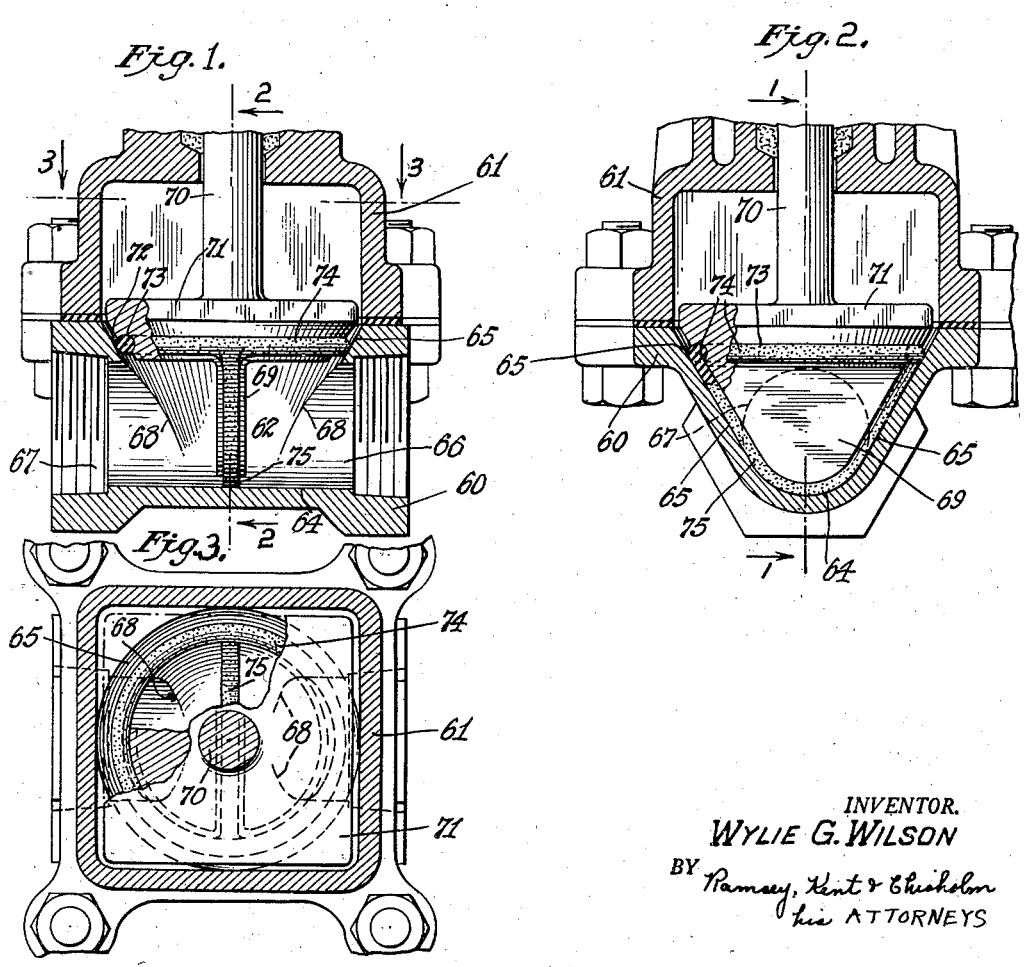
INVENTOR.
WYLIE G. WILSON
BY Ramsey, Kent & Chisholm
his ATTORNEYS

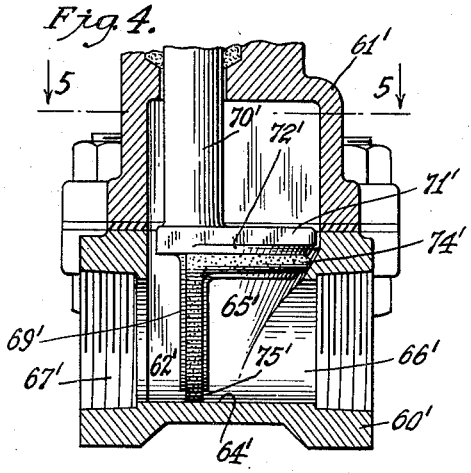
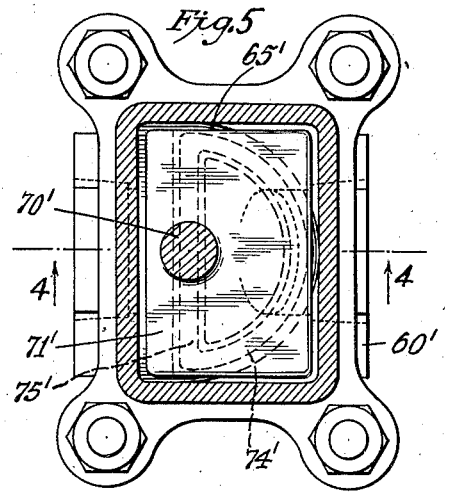
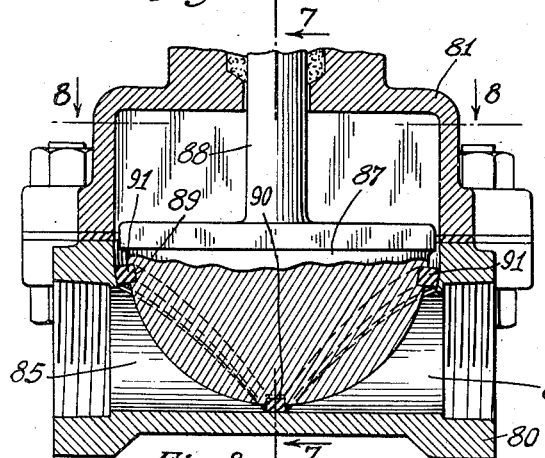
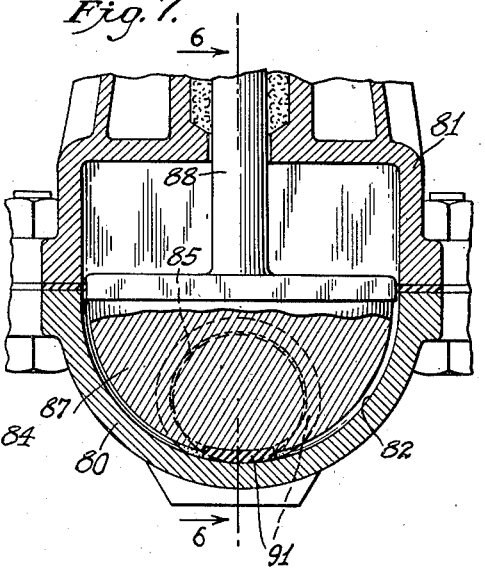
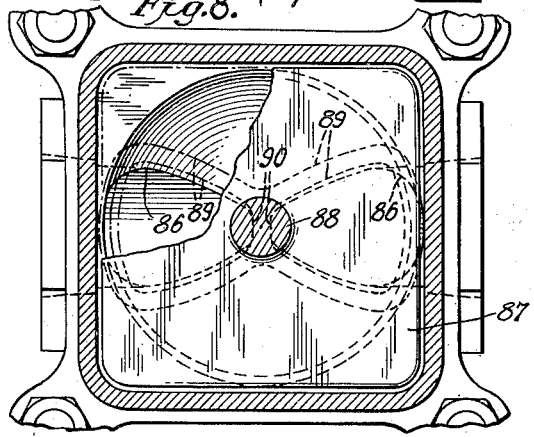

Patented May 20, 1947

2,420,849

UNITED STATES PATENT OFFICE 2,420,849

VALVE

Wylie G. Wilson, Elizabeth, N. J., assignor to Everlasting Valve Company, Jersey City, N. J., a corporation of New Jersey Application September 25, 1943, Serial No. 503,748

4 Claims. (Cl. 251—51)

This invention relates to improvements in valves, and more particularly to improvements in valves of the type used to control the passage of fluids.

An object is to provide a valve of such construction that extreme precision in machining of cooperating sealing parts is not necessary.

Another object is to provide a valve wherein sealing is accomplished by the compression of yielding elastic material between relatively unyielding surfaces within a valve casing.

Another object is to provide a valve in which sealing is accomplished by the compression of a continuous body of yielding elastic material between relatively unyielding surfaces respectively upwardly and downwardly curved but each merging into substantially horizontal shelves.

A further object is to provide a valve having a chamber between ports, the chamber having side walls diverging widely from the floor of the chamber, in conjunction with a sealing member carrying yielding resilient sealing material.

Another object is to provide a valve as just described in which the seal afforded by the sealing material is effected between the sealing member and the floor of the chamber and between the sealing member and an upper wall of the chamber.

Another object is to provide a valve in which the seal afforded by material as before described is effected between the floor of the valve-chamber and walls of the chamber located above, and which partially define, valve ports.

A further object is to provide a valve in which a valve-chamber has side walls diverging uniformly around the chamber from the bottom thereof, together with opposite ports piercing the side walls and a sealing member carrying yielding resilient material to contact the upper parts of the chamber walls in circular fashion and also to contact linearly alined parts of the walls and the chamber bottom between the ports.

A still further object is to provide a valve having a valve-chamber as just described and having a sealing member carrying yielding resilient sealing material so disposed as to surround the apertures in the side walls formed by the entry of the ports into the valve-chamber.

In carrying out the foregoing and other objects of the invention it is contemplated that valves, in the several embodiments of the invention hereinafter described, shall be so constructed as to utilize yielding resilient material as the actual proximate means by which a good fluid-tight seal can be obtained. This material may be either natural rubber, synthetic rubber, compounds of the same, or other material possessing the desired qualities. In the preferred forms of the invention valve casings are so formed as to have valve-chambers therein with ports in communication with the chambers. Each chamber may have a floor portion merged into side walls which diverge at a considerable angle. Such diverging side walls may be located only between opposite ports, or may extend completely around the chamber with opposite ports piercing these walls. In each instance use is made of a movable member carrying sealing material of the nature before mentioned, which material is so arranged relative to the movable member and the mouths of the ports as to obtain seals in the most advantageous fashion. In one form of the invention this material contacts the chamber floor and opposite side walls between the ports and also makes ring-like contact with the top of the side walls above the ports. In another embodiment the walls and floor of the valve-chamber are shaped to conform to a sealing element of substantially hemispherical or conoidal or equivalent form which has preferably though not necessarily a substantially flat top. Ports enter opposite portions of these walls, and sealing material is carried by the sealing element in such disposition that continuous sealing members contact the walls surrounding each port entry and thereby surround completely each of these entries.

Other modifications of the invention and variations of those before described as well as other features, objects, and advantages of the invention will become apparent by reference to the following detailed description of the accompanying drawings illustrating the invention, wherein Fig. 1 is a vertical section, partly in elevation and partly broken away, of part of valve incorporating another form of the invention, such section being taken substantially on the line 1—1 of Fig. 2;

Fig. 2 is a section, partly in elevation and partly broken away, taken substantially on the line 2—2 of Fig. 1;

Fig. 3 is a horizontal section, partly in elevation and partly broken away, taken substantially on the line 3—3 of Fig. 1;

Fig. 4 is a vertical section, partly in elevation and partly broken away, of a variation of the Fig. 1 embodiment, the section being taken substantially on the line 4—4 of Fig. 5;

Fig. 5 is a section taken substantially on the line 5—5 of Fig. 4;

Fig. 6 is a vertical section, partly in elevation and partly broken away, of a portion of a valve constituting another embodiment of the invention, this section being taken substantially on the line 6—6 of Fig. 7;

Fig. 7 is a section, partly in elevation and partly broken away, taken substantially on the line 7—7 of Fig. 6;

Fig. 8 is a horizontal section, partly in elevation and partly broken away, taken substantially on the line 8—8 of Fig. 6.

Referring now to the drawings and particularly to Figs. 1 to 3 inclusive, 60 indicates a lower valve casing member, the casing being completed by upper member 61. Member 60 has a valve-chamber 62 therein defined by a curved floor 64 merged into side walls 65 diverging upwardly uniformly in such fashion as to be substantially circular in cross-section (horizontal cross-section in these figures) at all points above the floor. Ports 66 and 67 of circular shape in cross-section extend inwardly sufficiently to pierce opposite portions of walls 65, resulting in openings having the shape (when viewed from above) shown at 68 in Fig. 3. Use is made of a sealing element comprising a barrier 69 extending from stem 70, and a relatively thick rectangular or at least non-circular flange or top 71 above the barrier (see Fig. 3), this flange part 71 corresponding, in its non-circularity, with the cross-section of valve-bonnet 61, so that rotation of the barrier and associated parts within the valve-chamber 62 is prevented and the barrier edge is always in substantially the position shown, i. e., transverse to the common axis of the ports. Flange 71 has a sloping conical wall 72 provided with a peripheral groove 73 in which is imbedded or otherwise secured an annular ring 74 of sealing material of a yielding resilient nature. This material may be natural or synthetic rubber, compounds thereof, or of other suitable material, the character of which can be determined by the nature of fluid in connection with the passage with which the valve is to be used. Continuous with ring 74 is a strip 75 of sealing material, which is attached to the curved edge surface of barrier 69, which surface has a curvature corresponding to that of the composite wall 64, 65.

In this form of the invention sealing is effected by compression of sealing ring 74 between the continuous wall 65 of the valve-chamber 62 and conical wall 72, and also by compression of strip 75 between the under surface of barrier 69 and composite wall 64, 65. Since parts 74 and 75 are continuous and are arranged as shown, it follows that a fluid-tight seal can be obtained by proper operation of the valve member.

This form of valve has the advantage of eliminating the necessity for specially machined valve seats with attendant pockets and the like in which material from the fluid passing through the valve is likely to be deposited and accumulated, and also of eliminating the need for precision-machined seats and valve elements, due to the fact that the yieldable resilient material can accommodate and conform itself to the usual manufacturing inequalities and uneven surfaces without impairment of sealing function.

The valve of Figs. 4 and 5 constitutes a variation in the structure in Figs. 1 to 3 inclusive, and similar parts have been given similar reference characters, but with exponents. For example, lower casing member 60' has a valve-chamber 62' therein defined partially by a curved floor 64' and by upwardly diverging side walls 65' which extend through 180° around the vertical line located by the axis of stem 70'. The remainder of the chamber (beyond a line extending diametrically through the stem 70') is of substantially rectangular shape in horizontal cross-section. A barrier 69' extends from stem 70' and a flange 71' of approximately 180° extent is above and continuous with the barrier. One port 66' extends inwardly to pierce the diverging wall 65' while the other port 67' leads directly into the chamber 62' through a straight vertical wall. A half ring 74' of sealing material fits around the sloping surface 72' of flange 71' being seated in a groove similar to groove 73; and continuous with member 74' is a strip 75' of similar material located as strip 75 of Fig. 1.

Sealing is accomplished with this arrangement in the same manner as in the Fig. 1 arrangement, with the exception that a seal is made by the material retained by flange 71' only through approximately 180° as distinguished from 360° in the other form. However, port 66' can be completely isolated from port 67' by a fluid-tight seal.

In Figs. 6 to 8 inclusive the valve is made up of a lower casing member 80 and an upper casing member 81. Member 80 is so shaped as to have a valve-chamber therein defined by walls, or, in other terms, a continuous wall, 82, so shaped and diverging upwardly as to fit around a plug of hemispherical shape, with a preferably flat non-circular (in plan) top, the top corresponding in its non-circularity with the cross-section of upper casing member or valve-bonnet 81, so that rotation of the plug may not take place in the operation of the valve. Opposite ports 84 and 85 are provided in the lower member 80, such ports being alined and substantially circular in cross-section, i. e., cross-axially of the ports, and extending inwardly to pierce the wall or walls 82 of the valve-chamber with the bottom longitudinal line of each port substantially coincident with the bottom or low point of the chamber, so that there is a straight line through ports and chamber. The piercing of the chamber wall or walls by these ports produces wall openings of configuration (when viewed from above) indicated at 86.

The sealing element associated with this valve comprises a plug 87 depending from stem 88, the plug being (for the major part) substantially hemispherical in form with a flat non-circular top, as already described, cooperative with the correspondingly formed valve-bonnet 81, to maintain the plug against rotation and in proper relation to the ports for sealing purposes. Cut in the curved surface of plug 87 in opposite disposition are grooves 89 of configuration similar to but larger than openings 86. The two wing-like grooves merge into a groove 90 at the bottom of the plug of width uniform with the width of the grooves surrounding openings 86. In these merged grooves is located a continuous member 91 of sealing material as before specified, such member having a form resembling joined wings, as shown in Fig. 8.

Sealing of this valve is accomplished by downward movement of plug 87, compressing the wing-like sealing material in grooves 89 and 90 and against the curved wall of the valve-chamber, with the sealing material surrounding openings 86 at a slight spacing from the edges thereof. A definite sealed barrier is thereby interposed between the ports with portions of the barrier intruding into the ports as shown in Fig. 6, and with a continuous seal around each port entry into the valve-chamber.

It has been pointed out that with respect to all the embodiments illustrated in the drawings, the bottom line from port to port through the valve-chamber is straight and without depressions or humps; that is to say, the floor of the valve chamber (or at least the lowermost straight longitudinal line thereof) is continuous with the lowermost straight longitudinal line of the floor of one of the straight tubular conduits that enters the valve-chamber; and in some cases, e. g., Figs. 1 to 8, where there are two such conduits entering the valve-chamber in longitudinal alinement, the floor of the valve chamber (or at least the lowermost straight longitudinal line thereof) has a similar continuity-relation to the floors of both conduits. And where the floor of the valve-chamber is curved in cross-section, as in Figs. 1 to 8, and the mouth of a conduit (or of two conduits if there are two in longitudinal alinement) is on the bias and non-planar, ranging upwardly from the floor of the valve-chamber, the movable valve member may travel in a path normal to the floor of the valve-chamber and seal off the conduit (or conduits) by compressing the sealing material that it carries, part of it between the movable valve member and the mouth of the conduit (or the mouths of the conduits), and part of it between the movable valve member and the floor of the valve-chamber. Care will be taken in designing the valve so that the rubber or other sealing material will be properly dimensioned as to width and depth so as to give most effective sealing, and properly positioned on the movable valve member so that when the "squeeze" is put on the sealing material in closing the valve, none of the material will be forced into or even overhang the port intended to be sealed off by it.

The elastic yieldability of the sealing material should be proportional to the smoothness of the cooperating metal surfaces. By using the necessary measures to produce very smooth castings so far as the cooperating sealing faces on the valve body are concerned, a very slightly yieldable sealing material will do. For ordinarily, smooth well made castings, or rougher, a rubber or comparably elastic material is preferable.

Another point to be considered in selecting the sealing material is that modern rubbers are available which are highly resistant to oils, gasoline, acids, etc. The particular sealing material will accordingly be chosen in view of, among other things, the nature of the fluid whose flow is to be controlled by the valve. Again, it is true that with a more elastically yieldable sealing material (within limits, of course), a good seal will be made even though there be grit between the sealing material and the cooperating surfaces of the valve body.

For some service asbestos sheet material of the kind used between flanges in flange joints might be used, this comprising asbestos fibers bonded by some suitable agent plus pressure during manufacture. If such material is used the loop or ring made of it will be wide enough in section to give a good seal and to make for better bonding to the valve part that carries it; and of course care must be taken in fixing the relation of parts so that the sealing material does not at any time during opening or closing movement of the valve touch or too closely approach the edge of the port sealed off by it.

A fiber sealing material, such as used in water faucets, may be used; and indeed any material that is sufficiently yieldable for the intended sealing purpose, and that will not disintegrate in use, that can be properly secured to the surface with which it is movable, and that will not stick, to an extent harmful to its integrity, to the cooperating surfaces of the valve body when the seal is broken after prolonged closure, will answer my purpose, depending on conditions. Even some of the modern plastics, having slight elasticity, may be used.

While I have spoken of the floor line of the passage through the valve body as a straight undeviating line from port to port, and with the floor of the passage free from humps or hollows, I include within that concept a structure in which a horizontal section through the flow passage in the valve body would show a curved flow line from port to port. In this case also the flow passage (and particularly the floor thereof) is to be free from surface interruptions, including projections and depressions.

I claim:

1. A valve-body having two axially alined ports with a valve-chamber between and affording unobstructed communication between the ports, the floor of the chamber being curved cross-axially of the ports and alined therewith, the side walls of the chamber diverging widely upwards from the floor and forming a continuous surface of revolution, and the upper end of the chamber being open, a valve element in the form of a barrier movable into and out of the chamber through the open upper end, the barrier having portions substantially conforming to the unbroken interior side walls and floor of the chamber, and a functionally continuous body of rubber or comparable material carried by the barrier and engaging and sealing with the interior side walls and floor of the chamber when the barrier is at the limit of its movement into the chamber, and having a portion in effective sealing relation between said ports and a portion in effective sealing relation between each port and the open upper end of said chamber.

2. A valve-body having two axially alined ports with a valve-chamber between and affording unobstructed communication between the ports, the floor of the chamber being curved cross-axially of the ports and alined therewith, the side walls of at least that portion of the chamber which includes one port diverging widely upwards from the floor and having a continuous surface of revolution, and the upper end of the chamber being open, a valve element in the form of a barrier movable into and out of the chamber through the open upper end, the barrier having portions substantially conforming to the unbroken interior side walls and floor of the chamber, and a functionally continuous body of rubber or comparable material carried by the barrier and engaging and sealing with the interior side walls and floor of the chamber when the barrier is at the limit of its movement into the chamber, and having a portion in effective sealing relation between at least said one port and the open upper end of said chamber.

3. A valve-body having two axially alined ports with a valve-chamber between and affording unobstructed communication between the ports, the floor of the chamber being curved cross-axially of the ports and alined therewith, the side walls of the chamber diverging widely upwards from the floor and forming a surface of revolution, and the upper end of the chamber being open, a valve element in the form of a barrier movable into and out of the chamber through the open upper end with its edges substantially conforming to the unbroken interior side walls and floor of the chamber, a circular member extending on both sides of the barrier and conforming to the upper portion of the side wall of the chamber at both sides of said barrier, and a functionally continuous body of resilient material comprising a ring portion secured to said circular member and a bowed portion secured to the edge of said barrier, which bowed portion is in effective sealing relation with the edge of the barrier and the interior wall of said chamber when the barrier is at the limit of its movement into the chamber; said ring portion then being in effective sealing relation between said circular member and the upper portion of the side walls of the chamber.

4. A valve-body having two ports with a valve-chamber between and affording unobstructed communication between the ports; the side and bottom chamber walls having the general contour of the superficies of a portion of a sphere and the upper end of the chamber being open, a valve element in the form of a barrier having a surface conforming to the unbroken portion of the chamber walls and movable into and out of the chamber through its open upper end, and a loop-like member of rubber or comparable material between said surface of the valve member and the wall of the chamber surrounding at least one of the ports, secured to said surface and effective to seal off communication between said one port and the chamber when the valve element is at the limit of its movement into the chamber.

WYLIE G. WILSON.

REFERENCES CITED

The following references are of record in the file of this patent:

UNITED STATES PATENTS

| Number | Name | Date |
|---|---|---|
| 1,613,072 | Wilson | Jan. 4, 1927 |
| 2,290,251 | Saunders | July 21, 1942 |
| 1,633,690 | Wilson | June 28, 1927 |
| 2,044,590 | Neuhaus | June 16, 1936 |
| 1,833,700 | Wolf | Nov. 24, 1931 |
| 1,064,376 | Race | June 10, 1913 |
| 1,089,160 | Scherr | Mar. 3, 1914 |
| 2,162,990 | Abercrombie | June 20, 1939 |
| 2,194,261 | Allen | Mar. 19, 1940 |

FOREIGN PATENTS

| Number | Country | Date |
|---|---|---|
| 9,072 | Great Britain | Apr. 29, 1905 |
| 409,308 | Germany | Feb. 3, 1925 |
| 168,260 | Great Britain | Sept. 1, 1921 |
| 372,482 | Great Britain | May 12, 1932 |
| 109,470 | Australia | Jan. 2, 1940 |